US009411763B2

(12) United States Patent
Saripalli

(10) Patent No.: US 9,411,763 B2
(45) Date of Patent: *Aug. 9, 2016

(54) ALLOCATION OF FLOW CONTROL CREDITS FOR HIGH PERFORMANCE DEVICES

(75) Inventor: Ramakrishna Saripalli, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/976,480

(22) PCT Filed: Jan. 13, 2012

(86) PCT No.: PCT/US2012/021304
§ 371 (c)(1),
(2), (4) Date: Nov. 21, 2013

(87) PCT Pub. No.: WO2013/105978
PCT Pub. Date: Jul. 18, 2013

(65) Prior Publication Data
US 2014/0089533 A1    Mar. 27, 2014

(51) Int. Cl.
*G06F 13/38*    (2006.01)
*G06F 9/48*    (2006.01)
*G06F 13/24*    (2006.01)

(52) U.S. Cl.
CPC ............ *G06F 13/385* (2013.01); *G06F 9/4812* (2013.01); *G06F 13/24* (2013.01)

(58) Field of Classification Search
CPC ...... G06F 13/385; G06F 9/4812; G06F 13/26
USPC .......................................................... 710/8
See application file for complete search history.

(56) References Cited

U.S. PATENT DOCUMENTS

| 6,172,963 | B1 * | 1/2001 | Larsson | H04L 47/10 370/229 |
| 6,798,744 | B1 * | 9/2004 | Loewen | H04L 12/5693 370/235 |
| 7,467,243 | B2 * | 12/2008 | Rashid et al. | 710/52 |
| 8,625,427 | B1 * | 1/2014 | Terry | 370/235 |
| 2003/0218977 | A1 * | 11/2003 | Pan | H04L 12/2602 370/230 |
| 2005/0185621 | A1 * | 8/2005 | Sivakumar | H04L 1/1887 370/335 |

(Continued)

OTHER PUBLICATIONS

International Preliminary Report on Patentability and Written Opinion received for PCT Patent Application No. PCT/US2012/021304, mailed on Jul. 24, 2014, 6 pages.

*Primary Examiner* — Henry Tsai
*Assistant Examiner* — John Roche
(74) *Attorney, Agent, or Firm* — Alpine Technology Law Group LLC

(57) ABSTRACT

Methods and apparatus relating to allocation of flow control credits for high performance devices are described. In some embodiments, controls and/or configuration structures may be provided for the OS (Operating System) or VMM (Virtual Machine Manager) to indicate possible processor affinity (e.g., of a device driver for a given PCIe device) to the platform components (in a platform dependent fashion, for example). Using this data, the platform components could configure the RC (Root Complex) ports and/or intermediate components (such as switches, bridges, etc.) to pre-allocate buffers for the links coupling the PCIe device to the RC ports or intermediate components. Other embodiments are also disclosed and claimed.

25 Claims, 5 Drawing Sheets

(56) References Cited

U.S. PATENT DOCUMENTS

| | | |
|---|---|---|
| 2008/0288661 A1 | 11/2008 | Galles |
| 2009/0037614 A1* | 2/2009 | Saripalli .................. 710/22 |
| 2009/0144508 A1 | 6/2009 | Freimuth et al. |
| 2009/0161584 A1* | 6/2009 | Guan ....................... 370/256 |
| 2010/0250807 A1* | 9/2010 | Miyoshi .................... 710/110 |
| 2010/0303079 A1 | 12/2010 | Singhal et al. |
| 2011/0072164 A1 | 3/2011 | Ajanovic et al. |
| 2011/0197011 A1* | 8/2011 | Suzuki et al. .............. 710/316 |
| 2013/0007768 A1* | 1/2013 | Saripalli ................... 719/317 |

* cited by examiner

ALLOCATION OF FLOW CONTROL CREDITS FOR HIGH PERFORMANCE DEVICES

FIELD

The present disclosure generally relates to the field of electronics. More particularly, some embodiments relate to allocation of flow control credits for high performance devices.

BACKGROUND

One common interface used in computer systems is Peripheral Component Interconnect (PCI) Express ("PCIE" or "PCIe", e.g., in accordance with PCI Express Base Specification 3.0, Revision 0.5, August 2008). High performance PCIe devices (when used in high-end systems, for example) often are not able to function at their full capacity when performing bus mastering and point-to-point transactions because the intermediate components generally do not have the buffering capacity to provide credits to the devices.

This lack of buffering usually results in high latencies even on high capacity interconnects such as PCIe and QPI (Quick Path Interconnect). This problem is compounded when the transactions have to cross multiple links, for example, in high-end systems and dense systems which support a relatively large amount of I/O (Input/Output) connected to PCIe or QPI.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some of the embodiments discussed herein may provide efficient allocation of flow control credits for high performance PCIe devices. As discussed above, because of insufficient buffering, PCIe devices may suffer from latency/bandwidth issues. For example, in current systems, each PCIe device may be subject to the flow control policies of the upstream component (such as a Root Complex (RC), PCIe switch/bridge, etc.). To this end, an embodiment provides for guaranteed flow control credits for a given PCIe device in order to ensure that it is able to meet its bandwidth and/or latency requirements.

In an embodiment, the allocation may be performed based on OS (Operating System) or VMM (Virtual Machine Manager) feedback corresponding to a processor thread affinity. Also, at least some of the embodiments discussed herein may be applied to high-performing PCIe devices that demand high-bandwidth and/or low-latency. Such devices may include PCIe based Ethernet devices, including but not limited to, FCoE (Fiber Channel Over Ethernet) controllers.

Furthermore, in an embodiment, the OS/VMM may communicate the processor affinity of the device driver for a given PCIe device to the platform chipset that contains the RC port that derives the hierarchy which contains the PCIe device. The chipset, optionally in conjunction with the OS/VMM, configures platform dependent structures and/or internal buffers to allocate the additional PCIe credits needed for the PCIe device. If the processor affinity includes more than one socket, the entire path from the PCIe device to all the sockets (including across any coherent interconnect such as QPI and/or MPL (Multi-Processor link)) may be configured/programmed with the flow control credits appropriate for the PCIe device. The actual amount of credits to be configured across the links may be determined by a software application, OS, VMM, QoS (Quality of Service) policies, platform hardware, etc., including combinations thereof.

Figure 1:
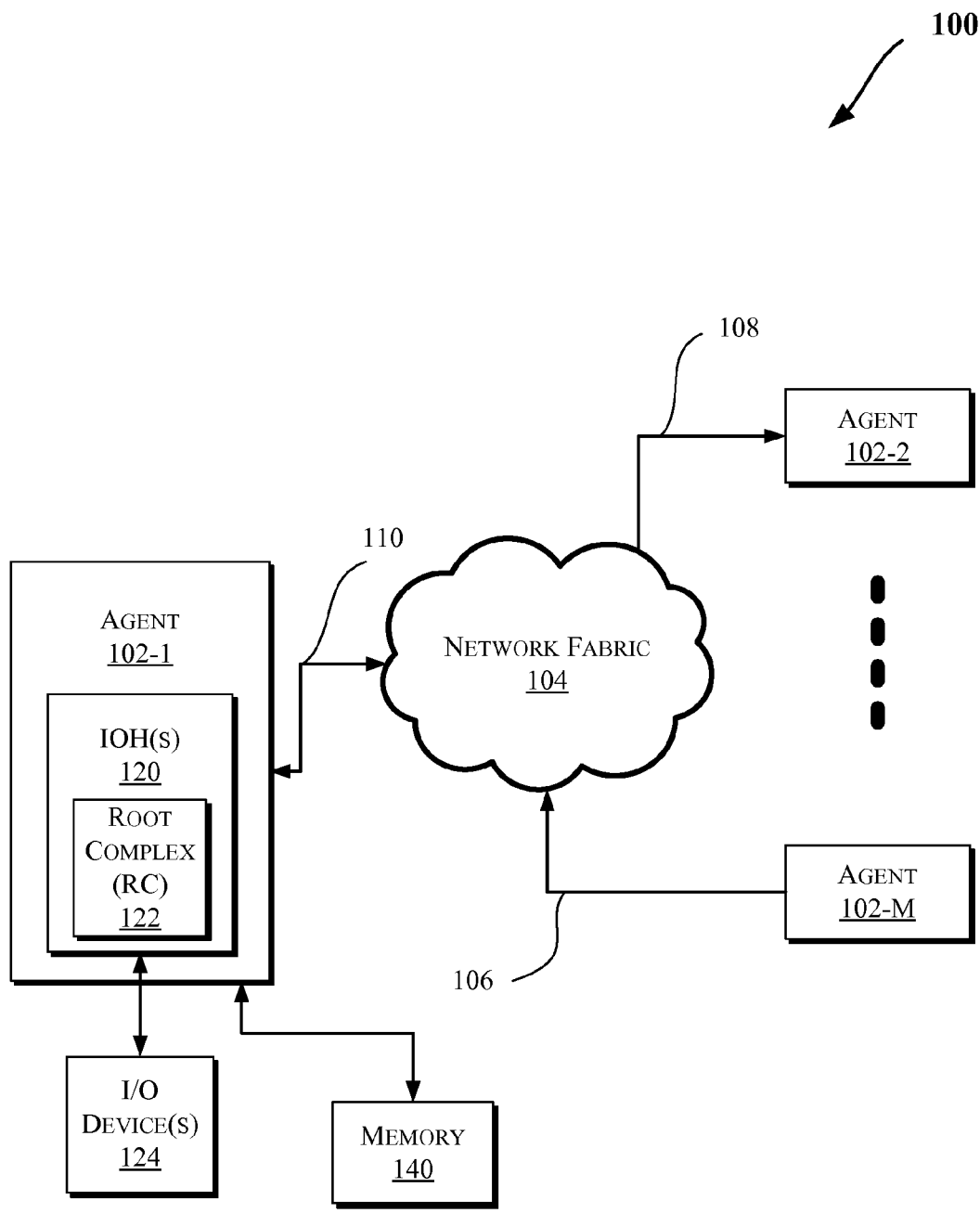
FIGS. 1-2 and 4-5 illustrate block diagrams of embodiments of computing systems, which may be utilized to implement various embodiments discussed herein.

Techniques discussed herein may be applied in various computing systems with one or more Root Complexes (RCs), e.g., with dynamically configurable flow control credits for the non-coherent or coherent interconnect, such as those discussed herein with reference to FIGS. 1-5. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the computing systems discussed with reference to FIGS. 2 and 4-5.

As illustrated in FIG. 1, the agents 102 may communicate via a network fabric 104. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Also, in accordance with an embodiment, one or more of the agents 102 may include one or more IOHs 120 to facilitate communication between an agent (e.g., agent 102-1 shown) and one or more Input/Output ("I/O" or "IO") devices 124 (such as PCI Express I/O devices). The IOH 120 may include a Root Complex (RC) to couple and/or facilitate communication between components of the agent 102-1 (such as a processor and/or memory subsystem) and the I/O devices 124 in accordance with PCI Express specification. In some embodiments, one or more components of a multi-agent system (such as processor core, chipset, input/output hub, memory controller, etc.) may include the RC 122 and/or IOHs 120, as will be further discussed with reference to the remaining figures.

As illustrated in FIG. 1, the agent 102-1 may have access to a memory 140. As will be further discussed with reference to FIGS. 2-5, the memory 140 may store various items including for example an OS, a device driver, etc.

Figure 2:
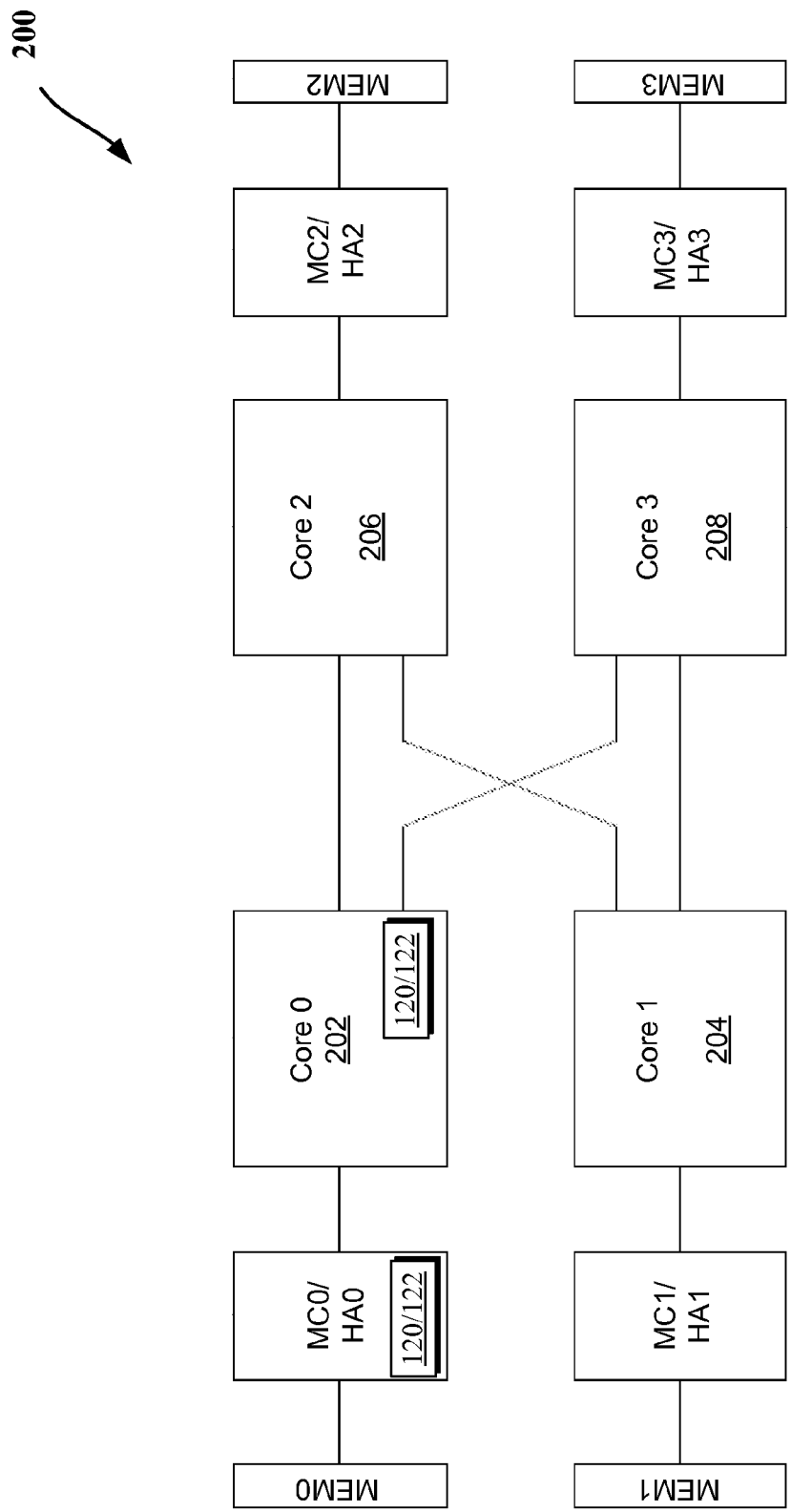

More specifically, FIG. 2 is a block diagram of a computing system 200 in accordance with an embodiment. System 200 may include a plurality of sockets 202-208 (four shown but some embodiments may have more or less socket). Each socket may include a processor and one or more of IOH 120 and RC 122. In some embodiments, IOH 120 and/or RC 122 may be present in one or more components of system 200 (such as those shown in FIG. 2). However, more or less 120 and/or 122 blocks may be present in a system depending on the implementation.

Additionally, each socket may be coupled to the other sockets via a point-to-point (PtP) link, such as a Quick Path Interconnect (QPI). As discussed with respect the network fabric 104 of FIG. 1, each socket may be coupled to a local portion of system memory, e.g., formed by a plurality of Dual Inline Memory Modules (DIMMs) that may include dynamic random access memory (DRAM).

As shown in FIG. 2, each socket may be coupled to a Memory Controller (MC)/Home Agent (HA) (such as MC0/HA0 through MC3/HA3). The memory controllers may be coupled to a corresponding local memory (labeled as MEM0 through MEM3), which may be a portion of system memory (such as memory 412 of FIG. 4). In some embodiments, the memory controller (MC)/Home Agent (HA) (such as MC0/HA0 through MC3/HA3) may be the same or similar to agent 102-1 of FIG. 1 and the memory, labeled as MEM0 through MEM3, may be the same or similar to memory devices discussed with reference to any of the figures herein. Generally, processing/caching agents may send requests to a home node for access to a memory address with which a corresponding "home agent" is associated. Also, in one embodiment, MEM0 through MEM3 may be configured to mirror data, e.g., as master and slave. Also, one or more components of system 200 may be included on the same integrated circuit die in some embodiments.

Furthermore, one implementation (such as shown in FIG. 2) may be for a socket glueless configuration with mirroring. For example, data assigned to a memory controller (such as MC0/HA0) may be mirrored to another memory controller (such as MC3/HA3) over the PtP links.

Figure 3:
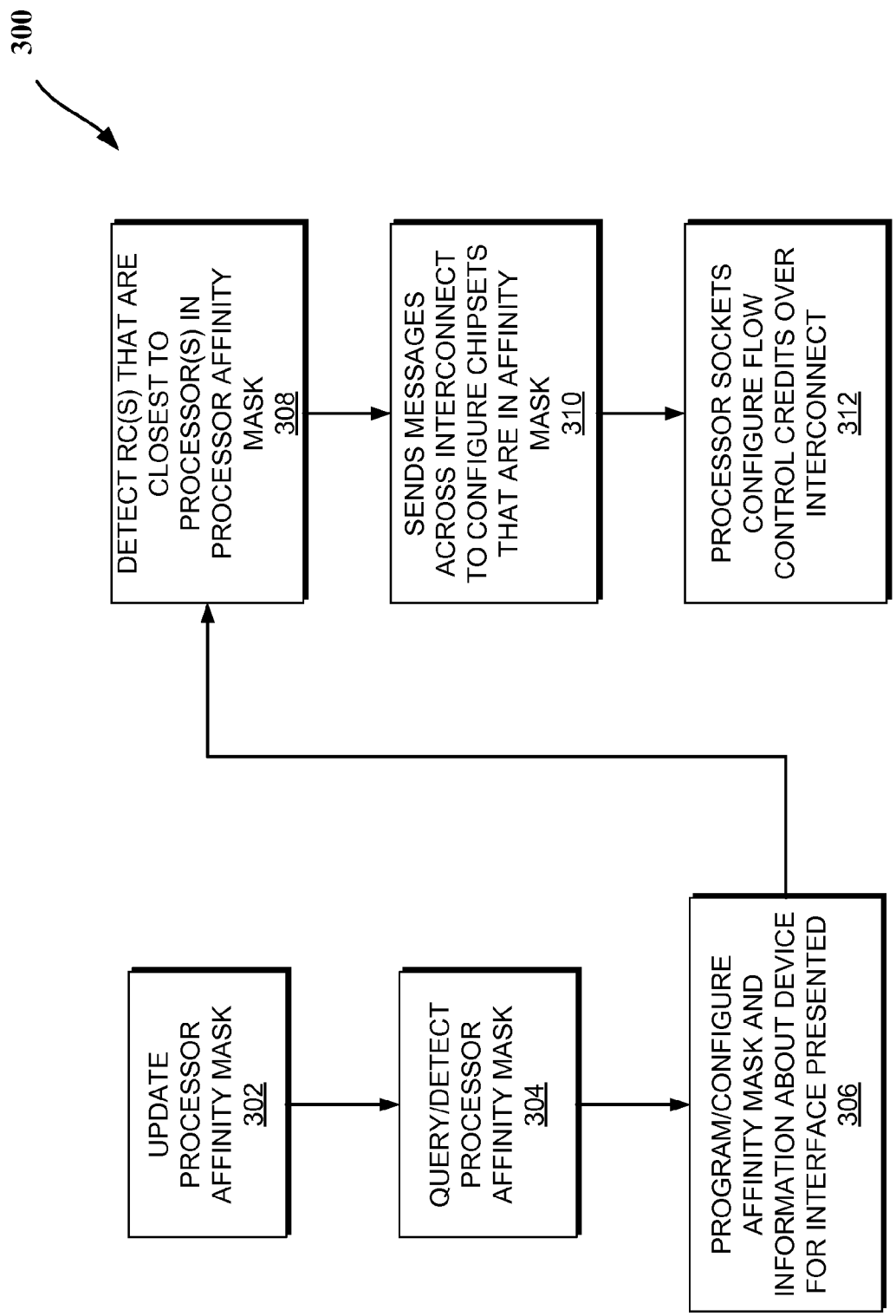
FIG. 3 illustrates a flow diagram in accordance with an embodiment of the invention.

FIG. 3 illustrates a flow diagram of a method 300 to allocate flow control credits for high performance devices, according to an embodiment. For example, the method 300 may be performed in the systems discussed herein with reference to FIGS. 1-2 and 4-5. Also, one or more of the operations discussed with reference to FIG. 3 may be performed by one or more of the components discussed with reference to FIG. 1-2 or 4-5.

As shown in FIG. 3, at an operation 302, an affinity mask (such as a processor affinity mask of a device driver) is updated either statically during initialization or dynamically. At an operation 304, the processor affinity mask may be queried (e.g., by OS or VMM). The query may be made from a PCIe device driver (e.g., stored in the memory 140). At an operation 306, system software (e.g., OS/VMM) may configure the affinity mask and/or information about a corresponding PCIe device and/or its driver to conform to an interface (e.g., presented by a chipset, such as the chipsets 406/520 of FIGS. 4-5).

At an operation 308, the RC on the local chipset may discover all the RCs that are closest to the processors in the processor affinity mask or it may receive this information from the OS/VMM. At an operation 310, one or more message(s) may be sent (e.g., by the local chipset) across an interconnect (such as a QPI or another coherent interconnect (such as MPL)) to configure all the chipsets that are in the affinity mask. At an operation 312, all processor sockets configure/program their required flow control credits (for the PCIe device) over the (e.g., coherent) interconnect.

For example, during initialization, a device driver may (optionally) indicate its processor affinity, e.g., during MSI (Message Signaled Interrupt) or MSI-X (MSI eXtended) interrupt registration; however, some embodiments apply even if the PCIe device driver does not communicate its processor affinity. Once the OS/VMM receives the processor affinity, the PCIe bus driver may use a HAL (Hardware Abstraction Layer) to discover the chipset controls, and using the chipset interface described herein, programs the RC on the local socket. Accordingly, some embodiments allows software and/or the chipset logic to configure each individual RC with the credits needed to support the PCIe device.

Moreover, as discussed herein, in various embodiments, one or more of the following components may be present: (1) a chipset (e.g., enhanced with the control logic/structures discussed herein, such as its HAL) that programs the RC flow control credits, e.g., dynamically under software control; (2) OS/VMM that may query the processor affinity of a particular device driver and configure the RC with the set of processors for the given PCIe device; and/or (3) ability to dynamically configure flow control credits across all the links reachable from a PCIe device to all the processors that are in the affinity set of its device driver (e.g., via additional registers for tuning the flow control credits). Also, no changes are necessary to the PCIe device itself or the device driver.

Accordingly, in some embodiments, controls and/or configuration structures may be provided for the OS/VMM to indicate possible processor affinity (e.g., of a device driver for a given PCIe device) to the platform components (in a platform dependent fashion, for example). Using this data, the platform components could configure the RC ports and/or intermediate components (such as switches, bridges, etc.) to pre-allocate buffers for the links coupling the PCIe device to the RC ports or intermediate components. With such embodiments, it is possible to provide a more deterministic service to PCIe devices. Various embodiments are expected to be used for PCIe devices (including but not limited to SR-IOV (Single Root (SR)-I/O Virtualization (IOV)) and MR-IOV (Multiple Root-IOV) devices), e.g., coupled directly to PCIe RC port(s). Also, additional control structures may be embedded in PCIe switches that may be programmed by system software.

Figure 4:
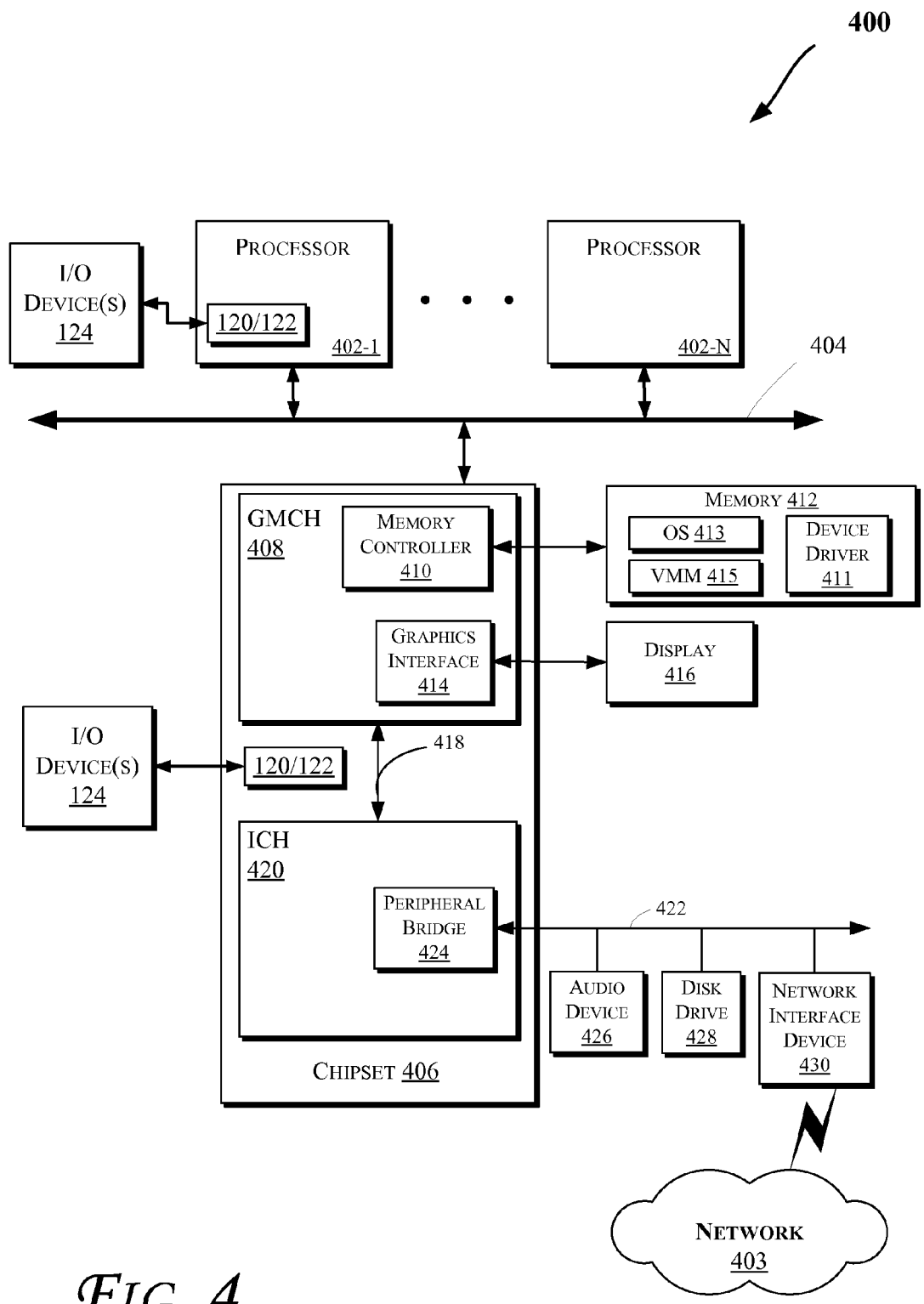

FIG. 4 illustrates a block diagram of a computing system 400 in accordance with an embodiment of the invention. The computing system 400 may include one or more central processing unit(s) (CPUs) 402-1 through 402-N or processors (collectively referred to herein as "processors 402" or more generally "processor 402") that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors.

Also, the operations discussed with reference to FIGS. 1-3 may be performed by one or more components of the system 400. In some embodiments, the processors 402 may be the same or similar to the processors 202-208 of FIG. 2. Furthermore, the processors 402 (or other components of the system 400) may include one or more of the IOH 120, and/or the RC 122. Moreover, even though FIG. 4 illustrates some locations for items 120/122, these components may be located elsewhere in system 400. For example, I/O device(s) 124 may communicate via bus 422, etc.

A chipset 406 may also communicate with the interconnection network 404. The chipset 406 may include a graphics and memory controller hub (GMCH) 408. The GMCH 408 may include a memory controller 410 that communicates with a memory 412. The memory 412 may store data, including sequences of instructions that are executed by the CPU 402, or any other device included in the computing system 400. For example, the memory 412 may store data corresponding to one or more: device driver(s) 411, an operation system(s) (OSes) 413, and/or VMM(s) 415, such as those discussed with reference to the previous figures. In an embodiment, the memory 412 and memory 140 of FIG. 1 may be the same or similar. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

Additionally, one or more of the processors 402 may have access to one or more caches (which may include private and/or shared caches in various embodiments) and associated cache controllers (not shown). The cache(s) may adhere to one or more cache coherent protocols. The cache(s) may store data (e.g., including instructions) that are utilized by one or more components of the system 400. For example, the cache may locally cache data stored in a memory 412 for faster access by the components of the processors 402. In an embodiment, the cache (that may be shared) may include a mid-level cache and/or a last level cache (LLC). Also, each processor 402 may include a level 1 (L1) cache. Various components of the processors 402 may communicate with the cache directly, through a bus or interconnection network, and/or a memory controller or hub.

The GMCH 408 may also include a graphics interface 414 that communicates with a display device 416, e.g., via a graphics accelerator. In one embodiment of the invention, the graphics interface 414 may communicate with the graphics accelerator via an accelerated graphics port (AGP). In an embodiment of the invention, the display 416 (such as a flat panel display) may communicate with the graphics interface 414 through, for example, a signal converter that translates a digital representation of an image stored in a storage device such as video memory or system memory into display signals that are interpreted and displayed by the display 416. The display signals produced by the display device may pass through various control devices before being interpreted by and subsequently displayed on the display 416.

A hub interface 418 may allow the GMCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). Other devices may communicate via the bus 422. Also, various components (such as the network interface device 430) may communicate with the GMCH 408 in some embodiments of the invention. In addition, the processor 402 and one or more components of the GMCH 408 and/or chipset 406 may be combined to form a single integrated circuit chip (or be otherwise present on the same integrated circuit die).

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
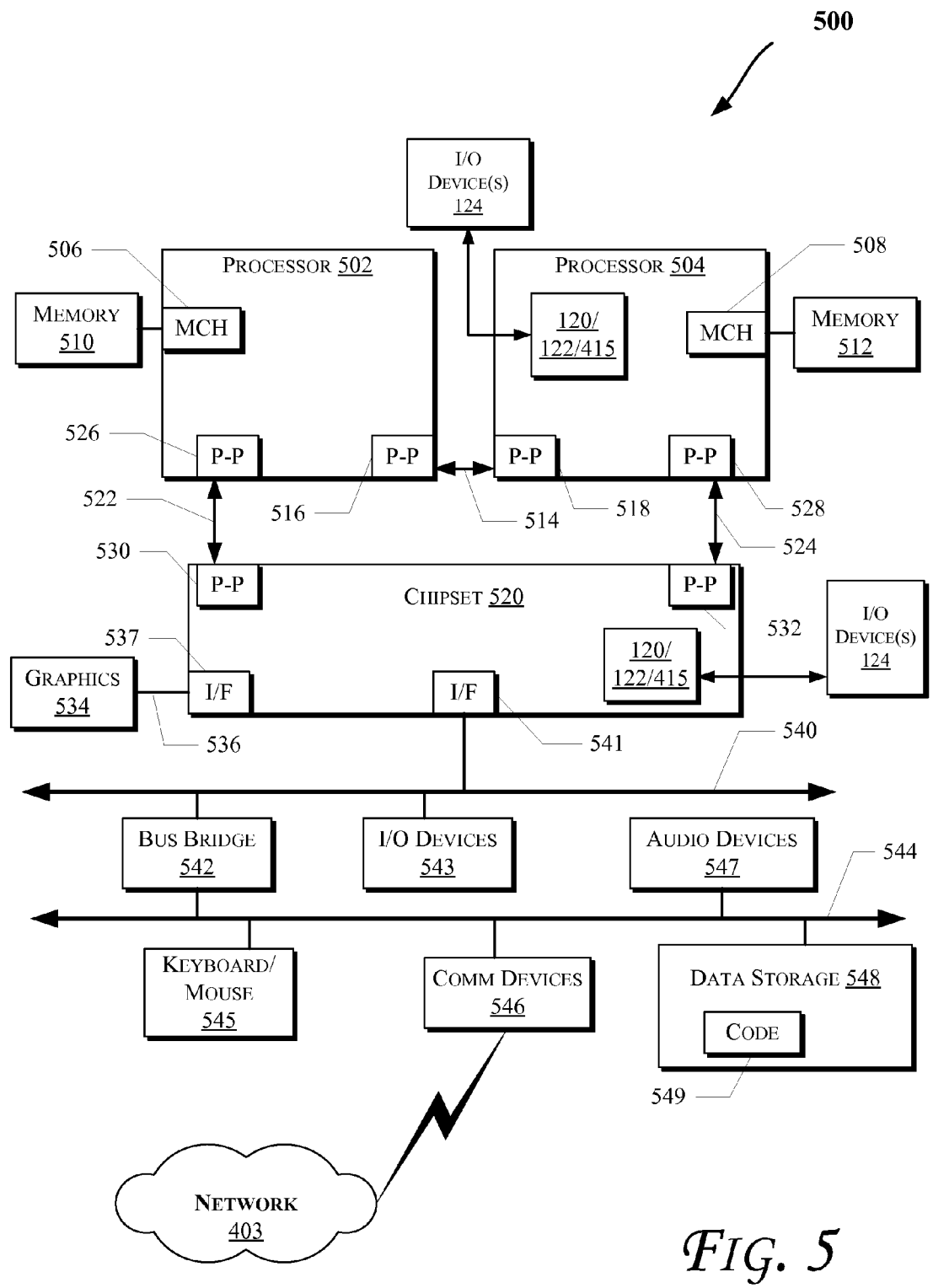

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4. As shown in FIG. 5, the processors 502 and 504 may also include the cache(s) discussed with reference to FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

At least one embodiment of the invention may be provided within the processors 502 and 504 or chipset 520. For example, the processors 502 and 504 and/or chipset 520 may include one or more of the IOH 120, the RC 122, and/or the VMM 415. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5. Hence, location of items 120/122/415 shown in FIG. 5 is exemplary and these components may or may not be provided in the illustrated locations.

The chipset 520 may communicate with a bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-5. Additionally, such tangible computer-readable media may be downloaded as a computer program product, wherein the program may be transferred from a remote computer (e.g., a server) to a requesting computer (e.g., a client) by way of data signals transmitted via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a first agent coupled to an Input/Output (I/O) device via a first link;
memory, coupled to the first agent, to store a device driver corresponding to the I/O device and a module,
wherein the device driver is to determine an affinity mask of the first agent and wherein the module is to query the affinity mask to cause configuration of the affinity mask and information about the I/O device to conform to the first link without regard for flow control policies of an upstream component, wherein an entire path from the I/O device to each socket is to be configured with flow control credits in response to a determination that the affinity mask corresponds to more than one socket, wherein each socket is to be coupled to the I/O device.

2. The apparatus of claim 1, wherein the module is to determine one or more root complexes that are closest to one or more agents identified by the affinity mask.

3. The apparatus of claim 1, wherein a root complex of the first agent is to determine one or more root complexes that are closest to one or more agents identified by the affinity mask.

4. The apparatus of claim 1, wherein the first link is to comprise a Peripheral Component Interconnect Express (PCIe) link.

5. The apparatus of claim 1, wherein the first agent is to transmit one or more messages over a second link to configure one or more agents in response to data identified by the affinity mask.

6. The apparatus of claim 5, wherein the one or more agents are to configure their respective flow control credits for the I/O device over the second link.

7. The apparatus of claim 5, wherein the second link is to comprise a point-to-point and/or coherent interconnect.

8. The apparatus of claim 1, wherein the module is to comprise an Operating System (OS) or a Virtual Machine Manager (VMM).

9. The apparatus of claim 1, wherein the affinity mask is to correspond to a processor of the first agent.

10. The apparatus of claim 1, wherein the information is to comprise an amount of flow control credits of the I/O device and wherein the flow control credits are to be determined by a software application, the module, QoS (Quality of Service) policies, platform hardware, or combinations thereof.

11. The apparatus of claim 1, wherein the first agent is to comprise a HAL (Hardware Abstraction Layer) to discover one or more controls of a chipset of the first agent and to configure a root complex of a local socket.

12. The apparatus of claim 1, wherein the I/O device is to comprise one or more of: a Fiber Channel over Ethernet device, a Single Root I/O (Input/Output) Virtualization device, or a Multiple Root I/O Virtualization device.

13. The apparatus of claim 1, wherein the device driver is to indicate the affinity mask during MSI (Message Signaled Interrupt) or MSI-X (MSI eXtended) interrupt registration.

14. The apparatus of claim 1, wherein the first agent is to comprise one or more of: one or more processor cores, a chipset, an I/O hub coupled between the first agent and the I/O device, one or more sockets, or a memory controller.

15. A method comprising:
  updating an affinity mask by a device driver of an input/output (I/O) device without regard for flow control policies of an upstream component;
  querying the affinity mask to determine information about the I/O device to conform to a first link that couples a first agent and the I/O device; and
  determining one or more root complexes that are closest to one or more agents identified by the affinity mask, wherein an entire path from the I/O device to each socket is configured with flow control credits in response to a determination that the affinity mask corresponds to more than one socket, wherein each socket is coupled to the I/O device.

16. The method of claim 15, wherein the updating is to be performed at initialization or dynamically.

17. The method of claim 15, further comprising transmitting one or more messages over a second link to configure one or more agents in response to data identified by the affinity mask, wherein flow control credits are to be determined in response to the one or more messages.

18. A computing system comprising:
  a first processor core coupled to an input/output (I/O) device via a first link;
  an I/O hub to couple the first processor core and the I/O device; and
  memory, coupled to the first processor core, to store a device driver corresponding to the I/O device and a module,
  wherein the device driver is to determine an affinity mask of the first processor core and wherein the module is to query the affinity mask to cause configuration of the affinity mask and information about the I/O device to conform to the first link without regard for flow control policies of an upstream component, wherein an entire path from the I/O device to each socket is to be configured with flow control credits in response to a determination that the affinity mask corresponds to more than one socket, wherein each socket is to be coupled to the I/O device.

19. The system of claim 18, wherein a chipset, coupled to the first processor core, is to transmit one or more messages over a second link to configure one or more agents in response to data identified by the affinity mask and wherein the one or more agents are to configure their respective flow control credits for the I/O device over the second link.

20. The system of claim 18, wherein one or more of the first agent, a second agent, and the memory are on a same integrated circuit chip.

21. The system of claim 18, wherein the module is to determine one or more root complexes that are closest to one or more agents identified by the affinity mask.

22. The system of claim 18, wherein a root complex of the first agent is to determine one or more root complexes that are closest to one or more agents identified by the affinity mask.

23. The system of claim 18, wherein the first link is to comprise a Peripheral Component Interconnect Express (PCIe) link.

24. The system of claim 18, wherein the first agent is to transmit one or more messages over a second link to configure one or more agents in response to data identified by the affinity mask.

25. The system of claim 18, wherein the information is to comprise an amount of flow control credits of the I/O device and wherein the flow control credits are to be determined by a software application, the module, QoS (Quality of Service) policies, platform hardware, or combinations thereof.

* * * * *